United States Patent [19]
Kajima

[11] Patent Number: 5,154,020
[45] Date of Patent: Oct. 13, 1992

[54] SPHERICAL SURFACE MACHINING APPARATUS AND TRANSPORTING APPARATUS THEREFOR

[75] Inventor: Hideo Kajima, Ina, Japan

[73] Assignee: Haruchika Precision Company Limited, Nagano, Japan

[21] Appl. No.: 661,708

[22] Filed: Feb. 26, 1991

[30] Foreign Application Priority Data

Mar. 1, 1990 [JP] Japan .................. 2-49842

[51] Int. Cl.$^5$ .............................................. B24B 7/00
[52] U.S. Cl. .................... 51/124 L; 51/127; 51/101 L G
[58] Field of Search ............ 51/124 R, 124 L, 125, 51/126, 127, 100 R, 101 L G, 105 L G

[56] References Cited

U.S. PATENT DOCUMENTS

| | | | |
|---|---|---|---|
| 3,535,826 | 10/1970 | Hertel | 51/127 |
| 3,835,596 | 9/1974 | Wrue | 51/124 L |
| 4,216,626 | 8/1980 | Starp | 51/124 L |
| 4,583,891 | 4/1986 | Eschenfelder et al. | 51/127 |
| 4,612,732 | 9/1986 | Delattre et al. | 51/101 L G |
| 4,737,053 | 4/1988 | Paolini | 51/101 L G |
| 5,027,561 | 7/1991 | Brule et al. | 51/101 L G |

Primary Examiner—M. Rachuba
Attorney, Agent, or Firm—Bauer & Schaffer

[57] ABSTRACT

A spherical surface machining apparatus for machining optical lenses, mirrors and so on is provided which comprises a reference cam, mounted on a body frame located on one side of a grinding plate, a swing body movably mounted on the reference cam for supporting a lower shaft of the grinding plate and a driving cam follower mounted on the swing body and meshing with a rack formed on part of the periphery of the reference cam, wherein the lower shaft of the grinding plate is rotated, and the driving cam follower is driven to swing the swing body, to thereby make free the spherical center swinging trajectory of the lower shaft of the grinding plate. A container for accommodating an optical lens, mirror or the like is transported to a predetermined position by a reciprocally movable supply conveyer, and fixed or released by fixtures. Material for lens, mirror or the like, accommodated in the container is delivered to a grinding plate, ground thereby, and accommodated again in the container which in turn is transported by a transporting conveyer.

3 Claims, 14 Drawing Sheets

SPHERICAL SURFACE MACHINING APPARATUS AND TRANSPORTING APPARATUS THEREFOR

BACKGROUND OF THE INVENTION

The present invention relates to a spherical surface machining apparatus for performing grinding and polishing so as to form a spherical surface of an optical lens, a mirror or the like.

Conventionally, machining of optical lenses, mirrors and so on are processed by first forming the surface of material of lenses, mirrors and so on (hereinafter simply called "the lens material") in a spherical shape by a rough grinding machine or a so-called grinding machine and lapping the spherically formed lens material by a polishing machine. Such a grinding machine, as shown in FIG. 1, holds a lens material 1 on a rotatable grinding holder a and grinds the lens material 1 with a diamond tool d mounted at the tip of a cup-shaped wheel c. This grinding machine 1, as is capable of forming convex, concave and flat surfaces, may be employed in a variety of uses. Even though the accuracy is not so high, it is generally used in a preprocessing which does not require such a high accuracy.

However, the above-mentioned grinding machine requires a complicated procedure of obtaining a synthetic spherical form, and performs a line cut, due to a strip type blade portion of the diamond tool d of the cup-shaped wheel c, which cannot provide so good finished surfaces as a surface cut, thereby giving rise to a grave problem in a lens lapping processing in which the accuracy in the preprocessing exerts great influences on the stability of the postprocessing.

To solve the above-mentioned problems, the present assignee has provided a spherical surface machining apparatus for optical lenses, mirrors and so on, as shown in FIG. 2. This apparatus allows selection of a reference cam 29 from those respectively having a different spherical surface of cam profile in accordance with desired spherical surface machining. In addition, a spindle 12 of a grinding plate 10 can be moved in an axial direction and fixed so as to meet the requirement of the spherical surface machining, which permits freely changing the spherical center swinging trajectory of the spindle 10 of the grinding plate 10, whereby any lens material 1 can be arbitrarily processed to form a desired spherical surface.

The above-mentioned apparatus can be used for any use, more specifically, for forming convex, concave and flat surface, and does not require complicated handling for setting the spherical surface. Further, since this apparatus performs a surface cut, a machining time can be largely reduced and highly accurate finished surface can be provided compared with conventional apparatus. Further, this apparatus can be used for polishing the lens material, in addition to grinding by changing a lens chucking method to provide a freedom for a lens attachment.

The above-mentioned spherical surface machining apparatus, though providing easy surface grinding while maintaining versatility and high accuracy, is constructed such that two reference cams 29 having highly accurate curve surface of the cam profile are disposed on lateral sides of the grinding plate 10, wherein the two reference cams 29 must be positioned symmetrically with respect to the grinding plate 10. However, such positioning is a quite time-consuming operation. Moreover, a swinging movement of the spindle 12 of the grinding plate 10 is performed by a swing apparatus b provided separately from a swing body 20. Therefore, this apparatus, in a complicated construction, not only requires a long time for exchanging or adjusting the reference cams 29 but also is quite expensive and large.

OBJECTS AND SUMMARY OF THE INVENTION

The present invention has been made by improving the above described spherical surface machining apparatus provided by the present assignee in view of the problems mentioned above, and its object is to provide a simply constructed spherical surface machining apparatus for optical lenses, mirrors and so on which is capable of easily performing a surface cut while maintaining a high accuracy and versatility and providing a reduced size and easy adjustment.

According to one aspect of the invention, there is provided a spherical surface machining apparatus for machining materials to be machined such as optical lenses and mirrors by rotating and swinging a lower shaft of a grinding plate and pressing the material to be machined on the spherical axis with respect to the grinding plate, the machining apparatus comprising:

an exchangeable reference cam, mounted on one side of the grinding plate, having a curved or plane cam profile and a portion of a cam surface formed with a rack; and a swing body movably mounted on the cam surface of the reference cam through a driving cam follower meshing with the rack for axially movably supporting the lower shaft of the grinding plate, wherein the lower shaft of the grinding plate is axially moved and the driving cam follower is driven to thereby make free the spherical center swinging trajectory of the lower the of the grinding plate.

According to a second aspect of the invention, there is provided a transporting apparatus for transporting machined materials such as optical lenses and mirrors comprising:

supply means having containers for accommodating the materials to be machined and fixtures for fixing and releasing each of the containers at a predetermined position, the supply means arranged reciprocally movable between the grinding plate and the chuck; and transporting means, associated with the supply means, for receiving the containers from the supply means and transporting the containers.

The above and other objects, features and advantages of the present invention will become apparent upon consideration of the following description when taken in conjunction with the accompanying drawings.

BRIEF DESCRIPTION OF THE DRAWINGS

FIG. 1 is an explanatory diagram showing a main portion of a conventional spherical surface machining apparatus for optical lenses, mirrors and so on;

FIG. 8 (2) is a lateral view showing the first process of the same;

FIG. 9 (2) is a lateral view showing the second process;

FIG. 10 (2) is a lateral view showing the third process;

FIG. 11 (2) is a lateral view showing the fourth process;

FIG. 12 (2) is a lateral view showing the fifth process;

FIG. 13 (2) is a lateral view showing the sixth process;

FIG. 14 (2) is a lateral view showing the seventh process.

DESCRIPTION OF THE PREFERRED EMBODIMENT

Figure 1:
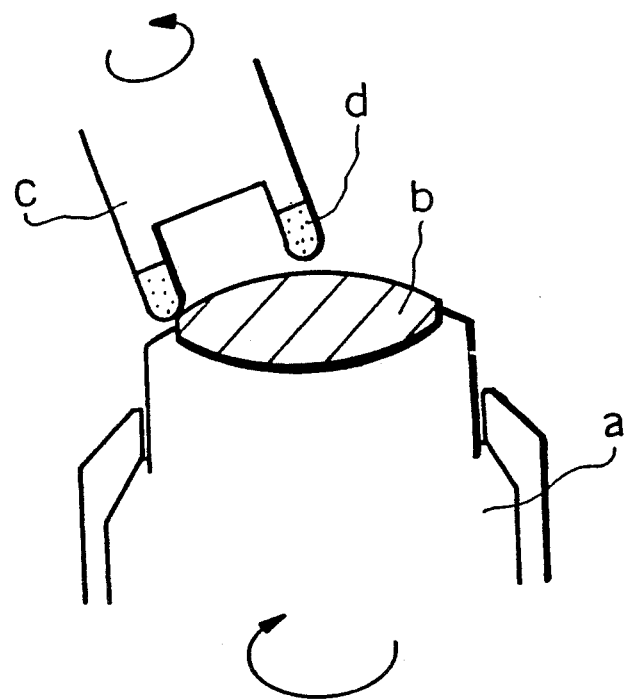
Figure 2:
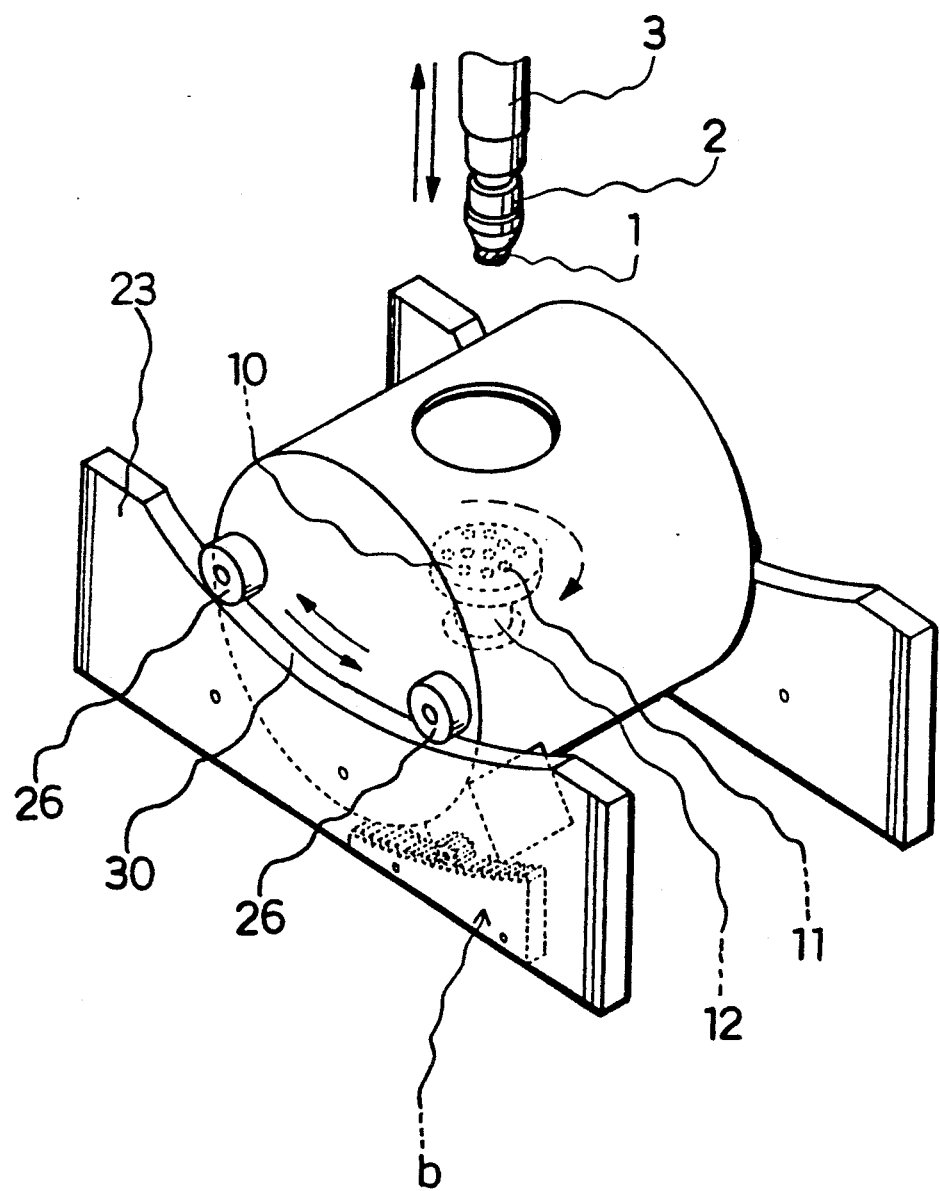
FIG. 2 is a perspective view of the conventional spherical surface machining apparatus shown in FIG. 1.
Figure 3:
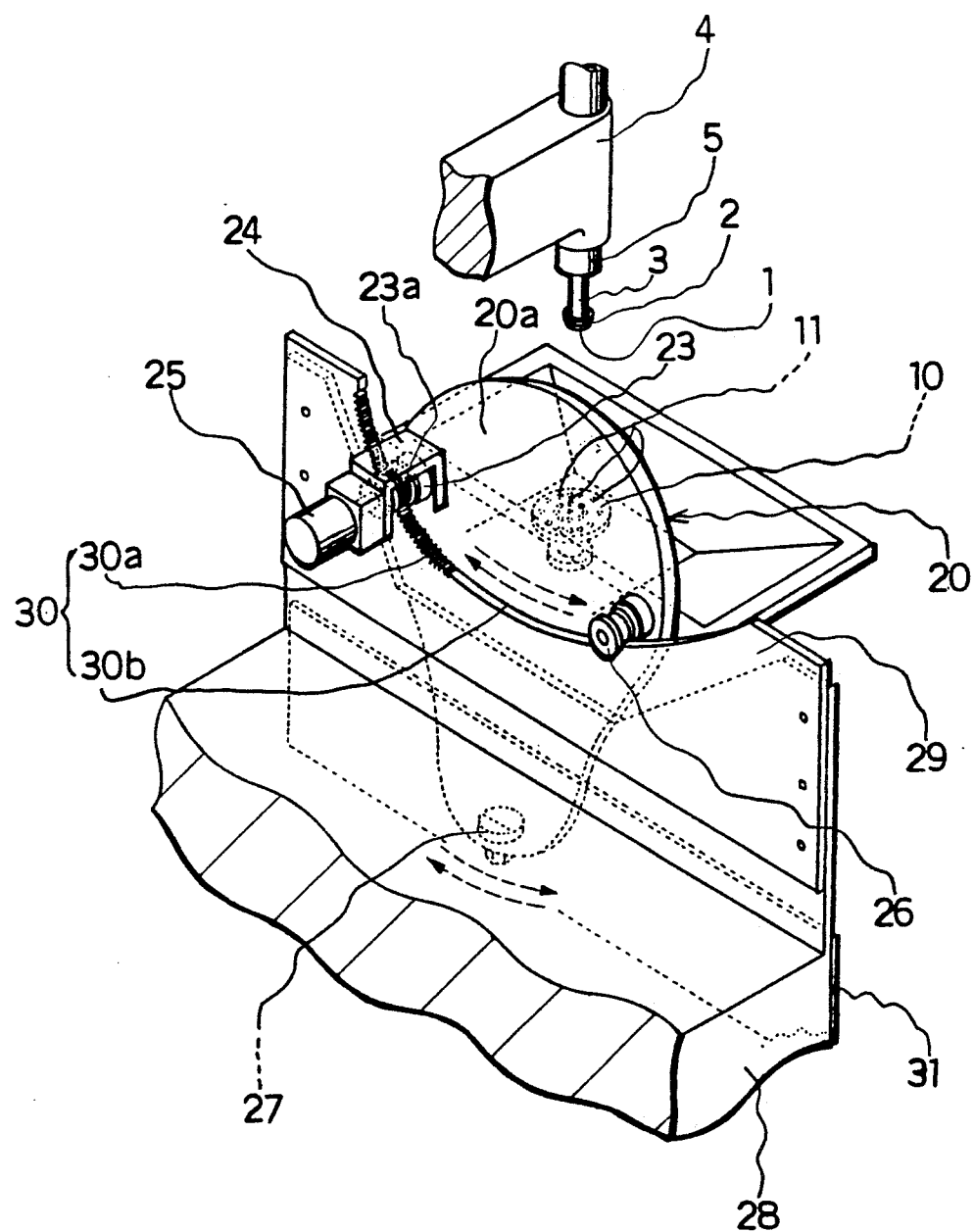
FIG. 3 is a partially cut-away perspective view showing an embodiment of a spherical surface machining apparatus for optical lenses, mirrors and so on according to the present invention.
Figure 4:
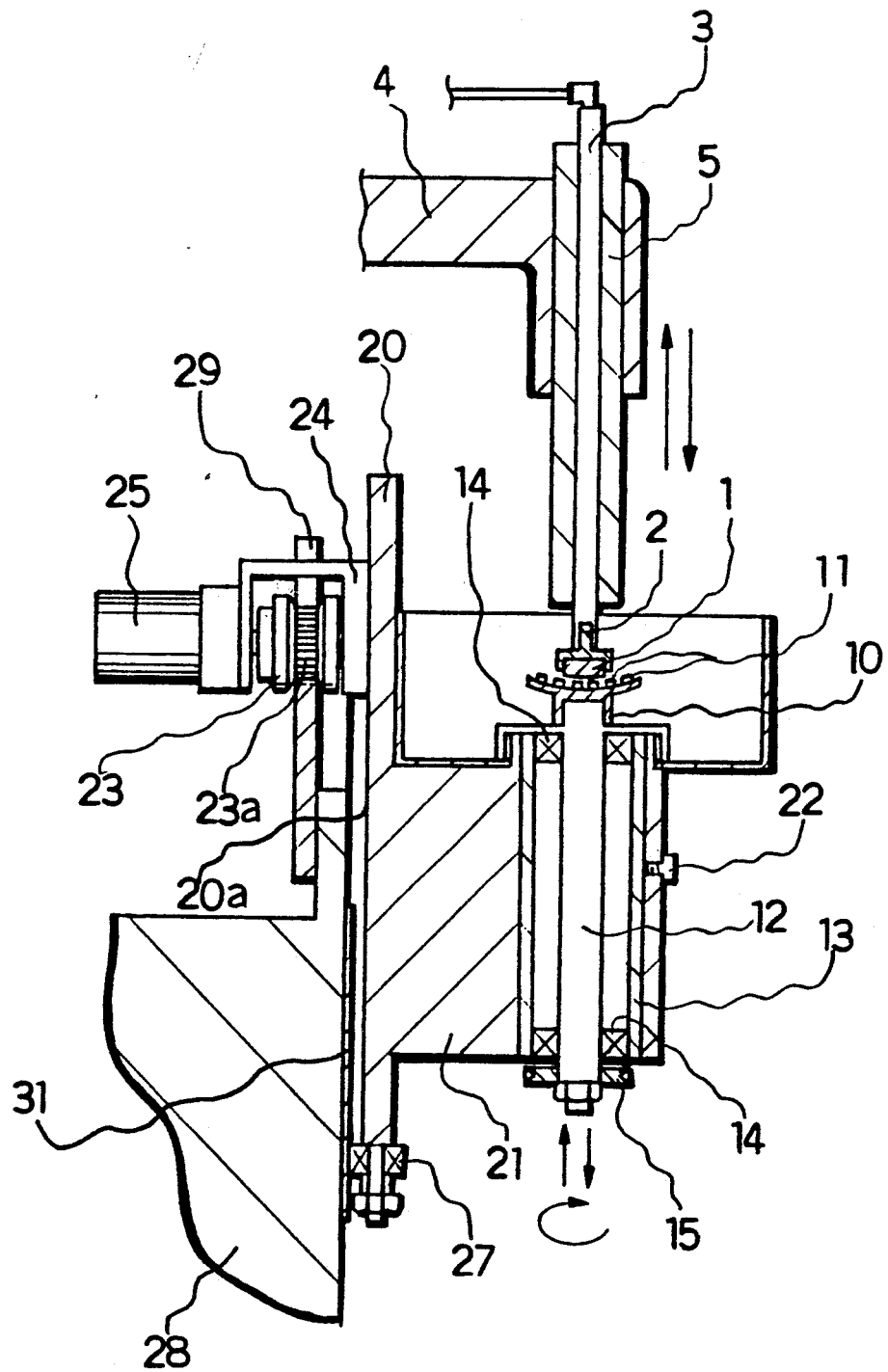
FIG. 4 is a partially cut-away cross-sectional view of the spherical surface machining apparatus of the present invention.
Figure 5:
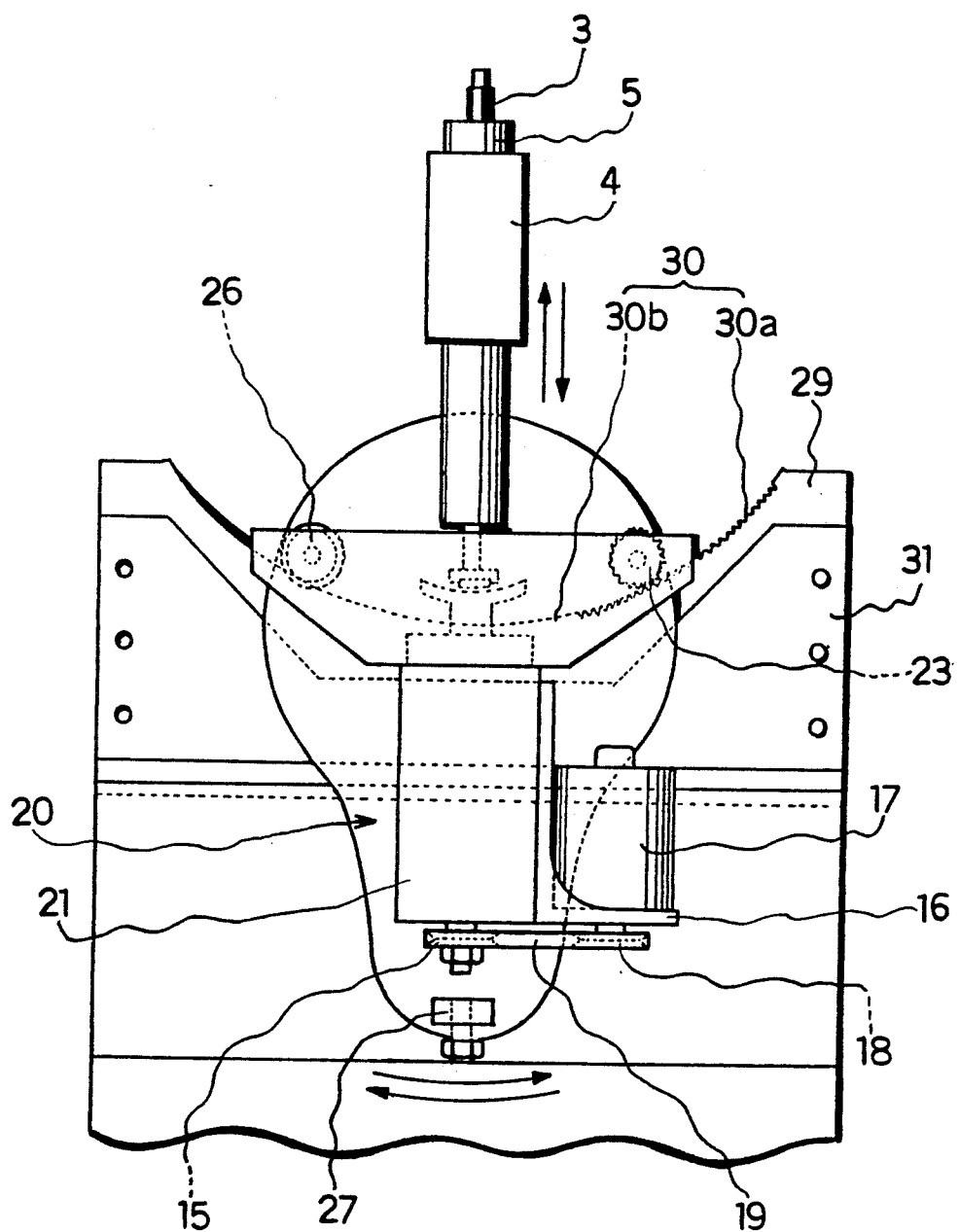
FIG. 5 is a partially cut-away front view of the spherical surface machining apparatus of the present invention.

Now, one embodiment of a spherical surface machining apparatus for optical lenses, mirrors and so on of the invention will hereinafter be described in detail with reference to FIGS. 3 to 7.

In the drawings, a lens material 1 or processed object is firmly supported by a chuck 2 which is secured on the lower edge of an upper shaft 3 pivotably arranged on an arm base 4 through an upper holder 5. Since the upper shaft 3 is axially elevated by means of the arm base 4, the lens material 1 firmly supported by the chuck 2 is also axially elevatable.

On a grinding plate 10, diamond pellets 11 of, for example, #300 are mounted at predetermined intervals. This grinding plate 10 is removably fixed on the upper edge of a spindle (lower shaft) 12 which is pivoted on a lower holder 13 through bearings 14. On the lower edge of the spindle 12, a pulley 15 is fixed, and a motor 17 is fixed on a bracket 16 protruded on a mount 21 of a swing body 20. On the driving shaft of the motor 17 a pulley 18 is fitted, such a construction allows the spindle 12 to rotate at a high speed, for example, 3000 r.p.m., by the motor 17 through a belt wound around the pulleys 15, 18.

The lower holder 13, supported by the mount 21 of the swing body 20, may be fixed at an arbitrary position on the mount 21 in the axial direction by means of a set bolt 22. On a lateral surface 20a of the swing body 20, a driving cam follower 23 having teeth 23a for serving as a pinion is rotatably mounted. This driving cam follower 23 is adapted normally and reversely rotatable by means of a motor or a driving unit 25 secured on a bracket 24 protruded on a lateral surface of the mount 21 of the swing body 20. Further, a swing cam follower 26 and a swing stop cam follower 27 are respectively mounted in a rotatable manner on a lateral surface 20a of the swing body 20.

The swing body 20 is movably mounted on a rack 30a and non-racked surface 30b of a cam surface 30 of a reference cam 29 removably mounted on a body frame 28 through the driving cam follower and the swing cam follower 26. Further, the swing body 20 is equipped with the swing stop cam follower 27 movably mounted on a support plate 31 having a surface perpendicular to the cam surface of the reference cam 29 mounted on the body frame 28. Therefore, the driving, swing and swing stop cam followers 23, 26 and 27 allow the swing body 20 to swing on the cam surface 30 of the reference cam 29 without disengagement or vibration.

The above-mentioned reference cam 29, since having the cam surface 30a composed of the rack 30a and the nonracked surface 30b, can provide the profile thereof freely determinable, for example, in convex, concave, flat and so on. If the reference cams 29 having radius of curvature of integer multiples of, for example, 100 mm are provided and a movable range of the spindle 12 in the axial direction is limited to, for example, 50 mm from a reference position of the reference cam 29 in the upward and downward directions, the apparatus of the present embodiment can attend to any spherical surface of the lens material 1 to be ground or polished.

The abrasion amount of the diamond pellet 11 due to grinding of the lens material 1 is measured by a counter, and the position of the diamond pellet 11 is corrected by slightly elevating the spindle 12 by means of a ratchet through an air cylinder or the like (these elements are not shown).

Next, reference will be made to how to handle the spherical surface machining apparatus for optical lenses, mirrors and so on constructed as described above.

First, the lens material 1 to be ground is mounted on the chuck 2, and a diamond pellet 11 which is assumed to provide a requisite and sufficient ground finished surface, for example, #300 is selected and mounted on the grinding plate 10.

Figure 6:
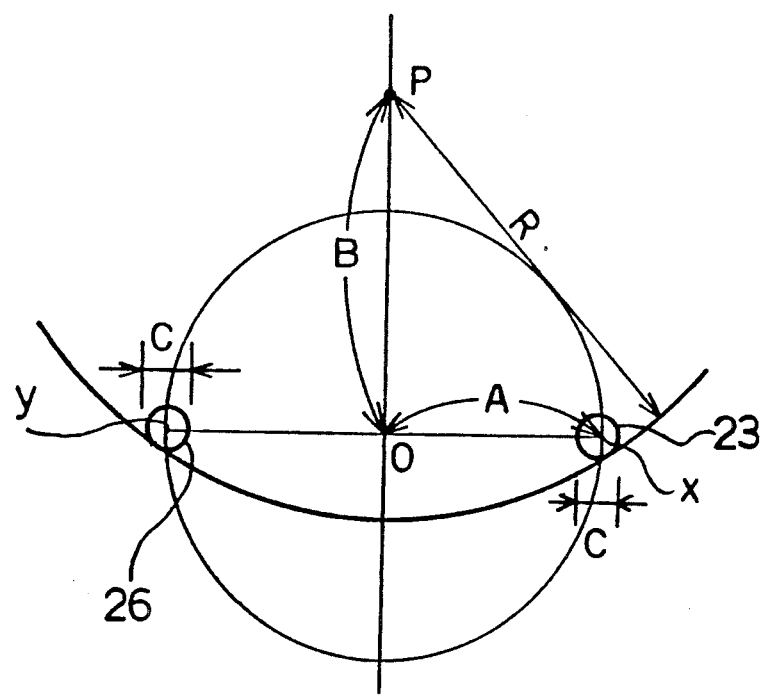
FIG. 6 is a diagram used for explaining a method of selecting a reference cam for a convex surface.

Since the radius (R) of the lens material 1 to be ground or polished has been determined, one of the reference cams 29 appropriate to this radius is selected. There are provided reference cams 29 having radius of integer multiples of 100 mm, and the grinding plate 10 is swingable on the reference cam 29 by support of the driving, swing and swing stop cam followers 23, 26 and 27. Therefore, the radius R of the reference cam 29, for example, for a convex surface cam, as shown in FIG. 6, is determined such that the center of the distance between the center x of the driving cam follower 23 and the center y of the swing cam follower 26 is designated the origin O, with the distances $\overline{xo}$, e,ovs/yo/ being represented by A. Then, the center of the radius R of the reference cam 29 is designated P, the distance of $\overline{PO}$ B, and the diameter of the driving and swing cam followers 23, 26 C, the radius R of the reference cam 29 can be calculated by the following formula (1):

$$R = \sqrt{B^2 + A^2} + C/2 \tag{1}$$

Figure 7:
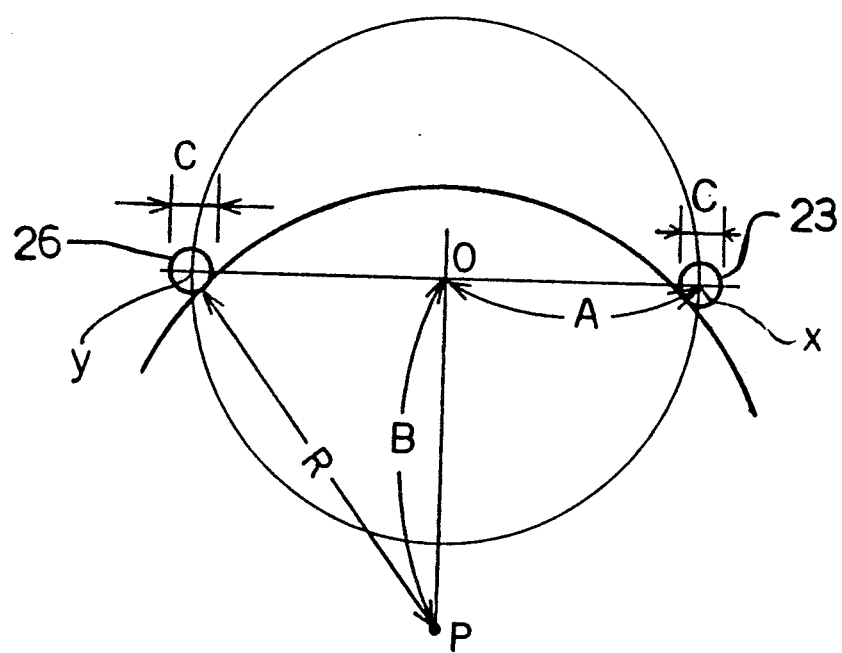
FIG. 7 is a diagram used for explaining a method of selecting a reference cam for a concave surface.

Since A, B, C are known, R is also determined by the above formula. For a concave surface cam, as shown in FIG. 7, the center of the distance between the center x of the driving cam follower 23 and the center y of the swing cam follower 26 is designated the origin O, with the distances $\overline{x_0}$, $\overline{y_0}$ being represented by A. Then, the center of the radius R of the reference cam 29 is designated P, the distance of $\overline{PO}$ B, and the diameter of the driving and swing cam followers 23, 26 C, the radius R of the reference cam 29 can be calculated by the following formula (2):

$$R = \sqrt{B^2 + A^2} - C/2 \qquad (2)$$

Since there are provided the convex surface and concave surface reference cams 29 having the radius R of 100 mm, 200 mm, 300 mm, . . . , that is, integer multiples of 100 mm, if the radius R of the convex surface reference cam 29 is calculated to be 140 mm, by way of example, the reference cam 29 having the radius of 100 mm is selected. In another case, if the radius of the convex surface reference cam 29 is calculated to be 70 mm by the formula (1), the reference cam 29 having the radius of 100 mm is selected. The concave surface reference cam 29 is selected in a similar manner to the convex surface reference cam 29 by the formula (2).

Next, the spindle 12 is moved within a range of 50 mm in the upward and downward direction based on the origin O in accordance with R of the lens material 1 to be ground or polished and fixed at an appropriate position on the swing body 20 by means of the lower holder 13.

After adjustment, the spindle 12 is rotated at a high speed by the motor 17, and the driving cam follower 23 is normally and reversely rotated by the motor 25, whereby the swing body 20 swings on the rack 30a of the reference cam 29, which results in that the spindle 12 exhibits freely changing the spherical center swinging trajectory through the swing body 20. Further, by simultaneously pressing the arm base 4 in the downward direction, the lens material 1 can be ground or polished to freely form a spherical surface.

As described above in detail, according to the spherical surface machining apparatus of the present embodiment, one of the reference cams appropriate to a desired form of spherical surface is selected and mounted on one side of the grinding plate, the lower shaft of the grinding plate is moved to be positioned according to the object of spherical surface machining, and the driving cam follower is driven, whereby the spherical center swinging trajectory of the lower shaft of the grinding plate becomes free through the swing body, therefore making it possible to freely machine optical lenses, mirrors and so on to form desired spherical surfaces. It will be appreciated that a single apparatus can be used for forming any desired spherical surface such as a convex surface, a concave surface, a flat surface and so on. Also, since only one reference cam is required for the machining, the handling necessary for setting a spherical surface is quite easy. Further, the surface cut performed by the apparatus of the present embodiment can provide a largely reduced machining time and highly accurate finished surfaces. Furthermore, the apparatus can be used also as a polishing machine by changing a lens chucking method so as to provide a freedom to the lens attachment.

In addition to the above-mentioned effects, since the swing body is inseparably supported on the reference cam by means of the driving, swing and support cam followers, the spherical center swinging trajectory of the lower shaft of the grinding plate is free of vibration even with a single reference cam.

Further in addition to the above-mentioned effects, the spherical center swinging trajectory of the lower shaft of the grinding plate can be obtained through the swing body by driving the driving unit equipped with the swing body to rotate the driving cam follower so that the construction of the driving unit for providing swinging movement is simple and the size of the overall apparatus can be reduced.

Next, a transporting machine equipped with the above-mentioned spherical surface machining apparatus for optical lenses, mirror and so on will be explained with reference to FIGS. 8 to 14.

A container 40, provided for accommodating the lens material 1, is transported by a supply belt conveyer (supplier) 41. The supply belt conveyer 41 is operable by rotating a roller 42 by means of a motor (not shown). The supply belt conveyer 41 has fixtures 43, 44 mounted in a left end portion of FIG. 8 (1) with which the container 40 can be fixed on the supply belt conveyer 41. The supply belt conveyer 41 itself is reciprocally movable in a transporting direction between the grinding plate 10 and the chuck 2. This reciprocal movement is performed such that the axis of the chuck 2 is positioned on the axial center of the lens materials 1 on the containers 40 fixed on the supply belt conveyer 41 by the fixtures 43, 44. The containers 40 accommodating machined lens materials 1 are transported to a predetermined position by a transporting belt conveyer (carrier) 45.

Next, a transportation method for optical lenses, mirrors and so on based on the thus constructed transporting machine will be explained.

Figure 8:
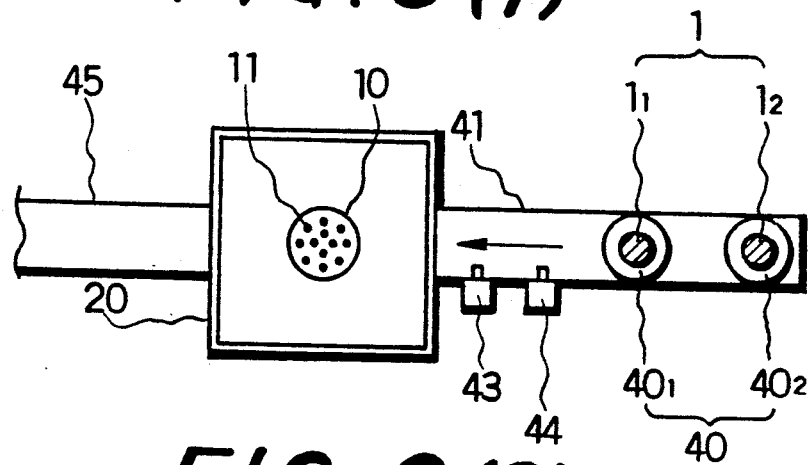
FIG. 8 (1) is a plan view showing a first process of a transporting machine for optical lenses, mirrors and so on equipped with the spherical surface machining apparatus.
Figure 8:
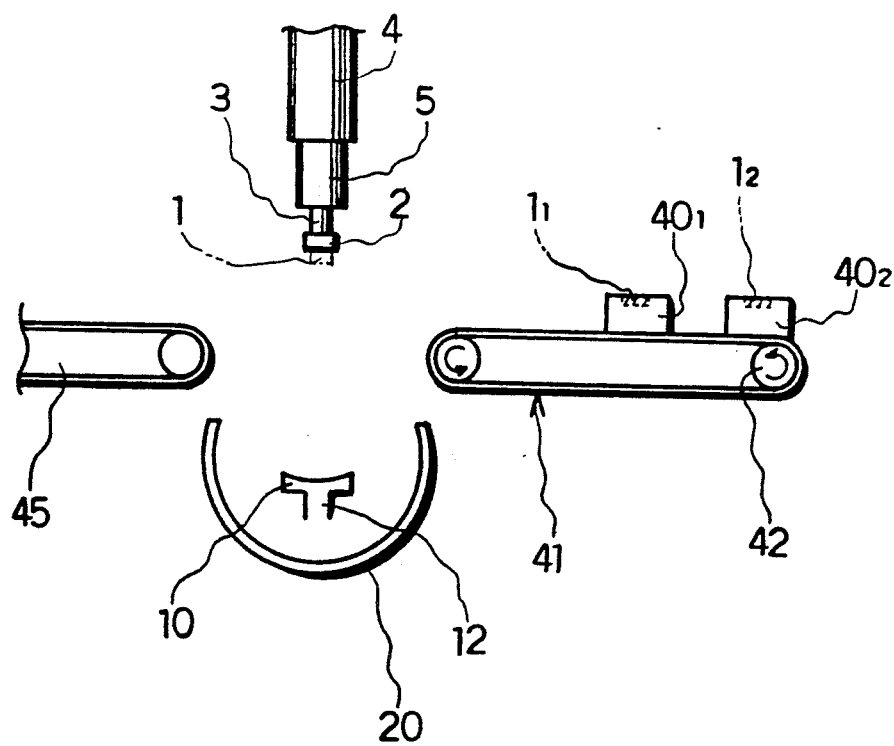

FIG. 8 shows the first process of a method of transporting optical lenses, mirrors and so on, wherein a predetermined number of containers 40, for example, three containers $40_1$, $40_2$, $40_3$ are provided for accommodating lens materials $1_1$, $1_2$, $1_3$ to be ground, and the containers $40_1$, $40_2$ are carried on the supply belt conveyer 41.

Figure 9:
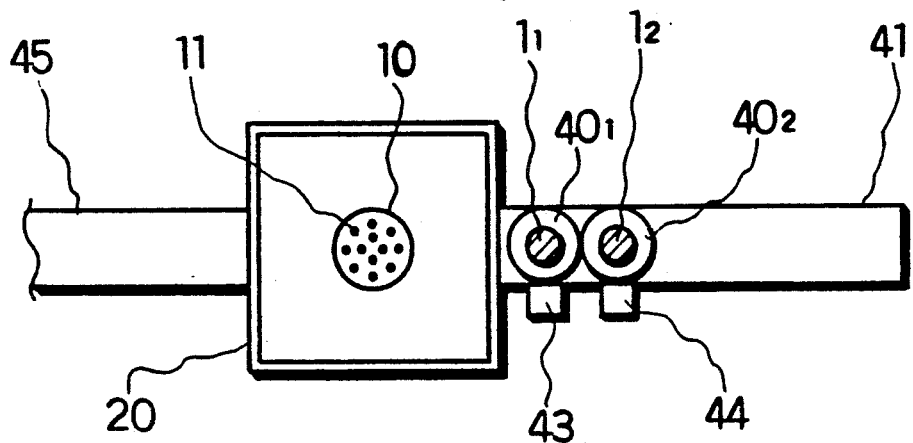
FIG. 9 (1) is a plan view showing the second process.
Figure 9:
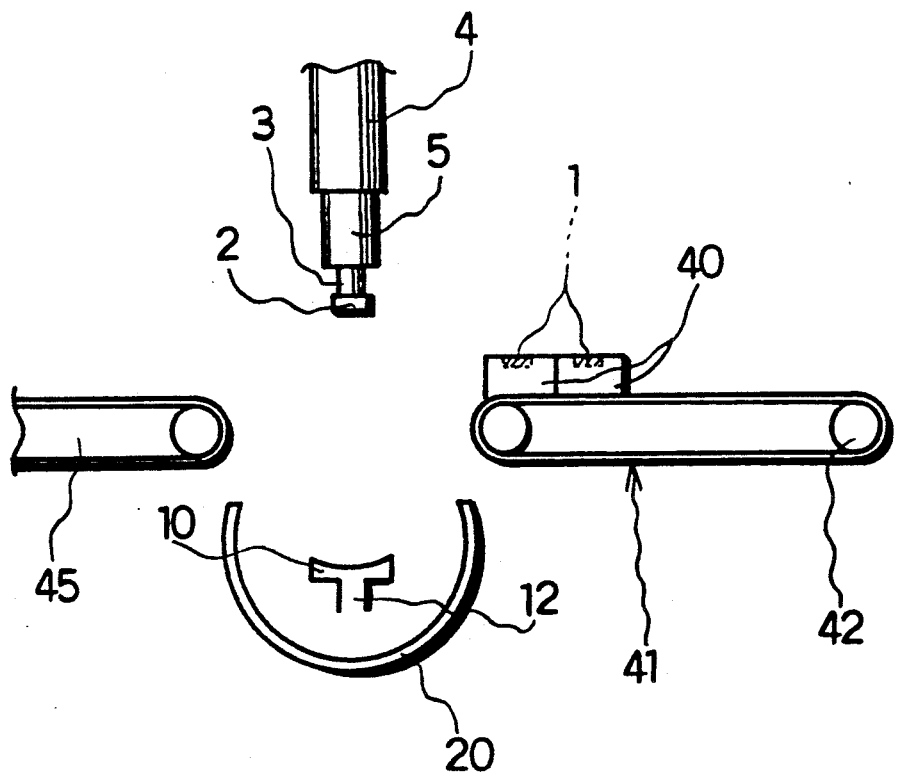

FIG. 9 shows the second process of the transportation method, wherein a roller 42 is rotated to run the supply belt conveyer 41 for transporting the containers $40_1$, $40_2$ to the positions of fixtures 43, 44 where the containers $40_1$, $40_2$ are fixed by the fixtures 43, 44, respectively.

Figure 10:
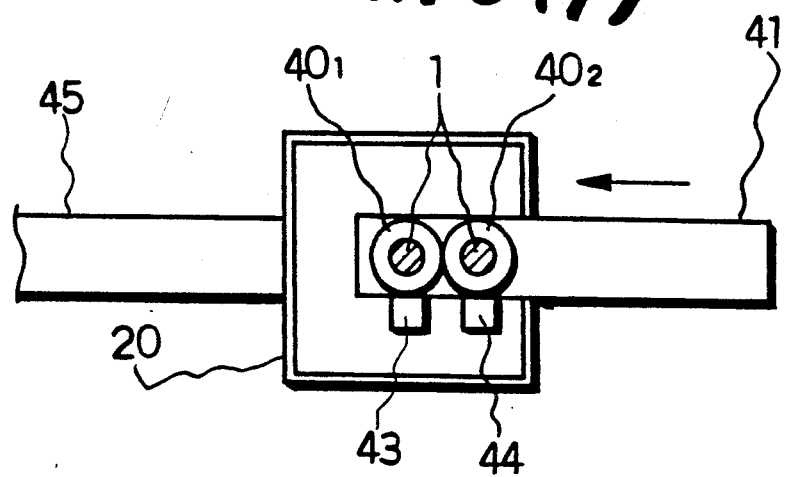
FIG. 10 (1) is a plan view showing the third process.
Figure 10:
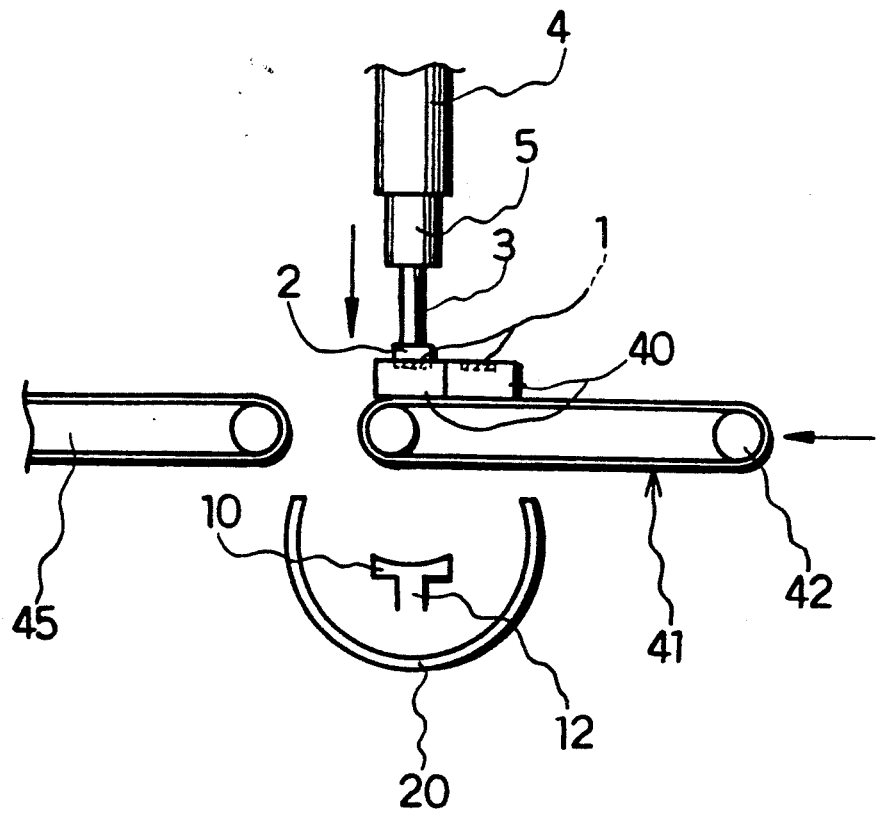

FIG. 10 shows the third process, wherein the supply belt conveyer 41 itself is moved up to a first position in the lefthand direction of the drawing. This first position is a position where the axis of the chuck 2 substantially passes the axial center of the lens material $1_1$ accommodated in the container $40_1$.

Figure 11:
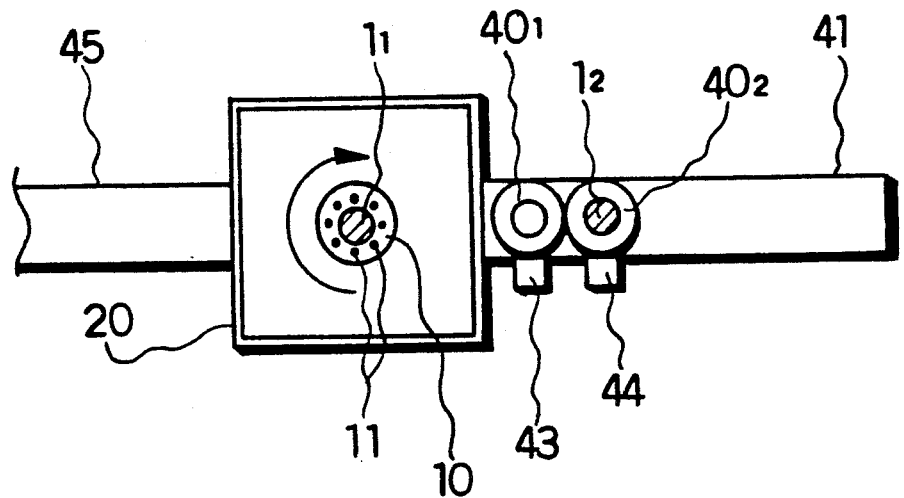
FIG. 11 (1) is a plan view showing the fourth process.
Figure 11:
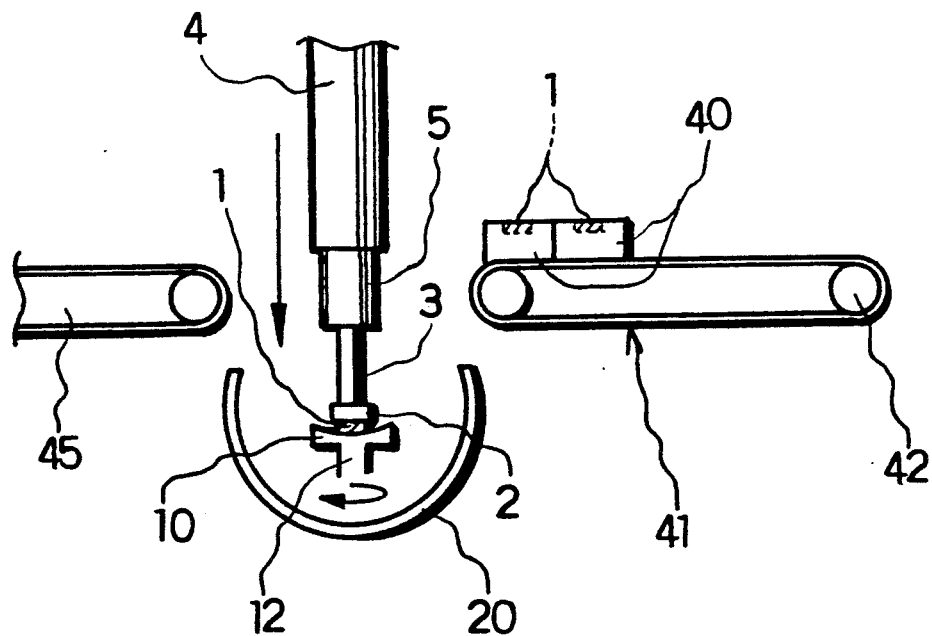

FIG. 11 shows the fourth process wherein the chuck 2 is lowered by lowering the upper shaft 3 to firmly absorbed the lens material $1_1$ on the chuck 2 and then elevating the chuck 2 by elevating the upper shaft 3, followed by moving the supply belt conveyer 41 in the righthand direction of FIG. 11, lowering the arm base 4 and start the grinding of the lens material $1_1$.

Figure 12:
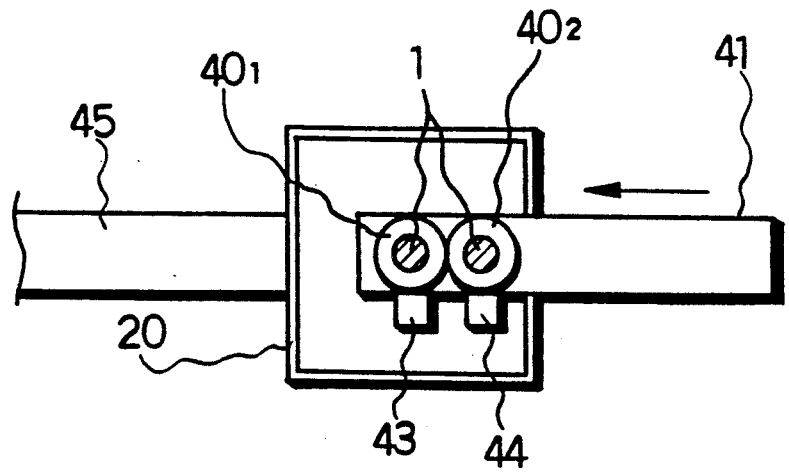
FIG. 12 (1) is a plan view showing the fifth process.
Figure 12:
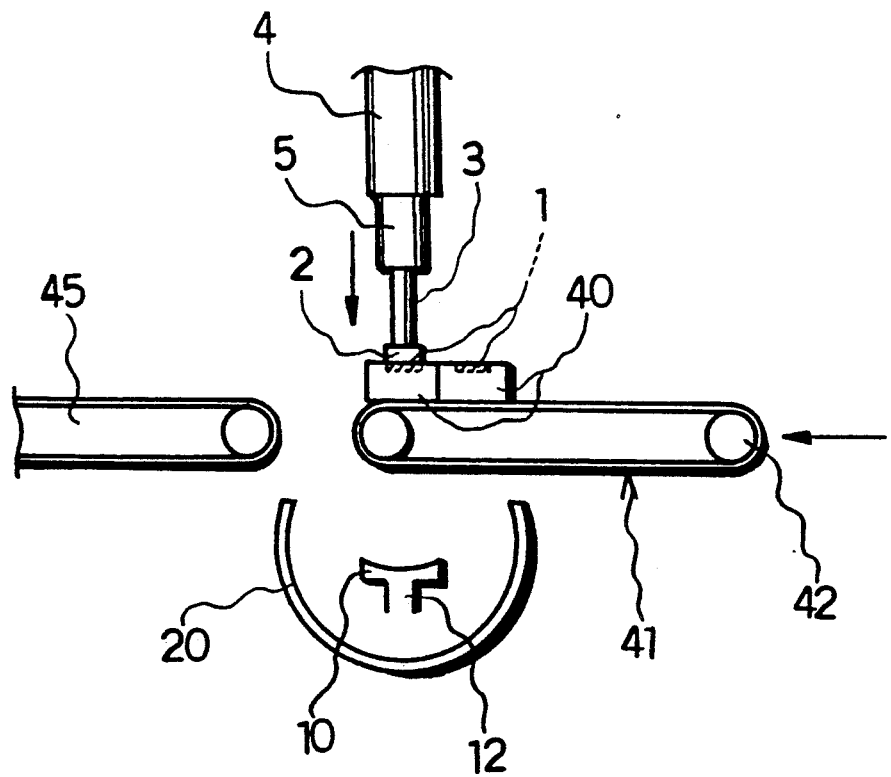

FIG. 12 shows the fifth process. When the lens material 11 has been ground, the arm base 4 is elevated, and the belt conveyer 41 is moved in the lefthand direction up to the first position. Next, the upper shaft 3 is lowered to lower the chuck 41 to reaccommodate the lens material $1_1$ in the container $40_1$.

Figure 13:
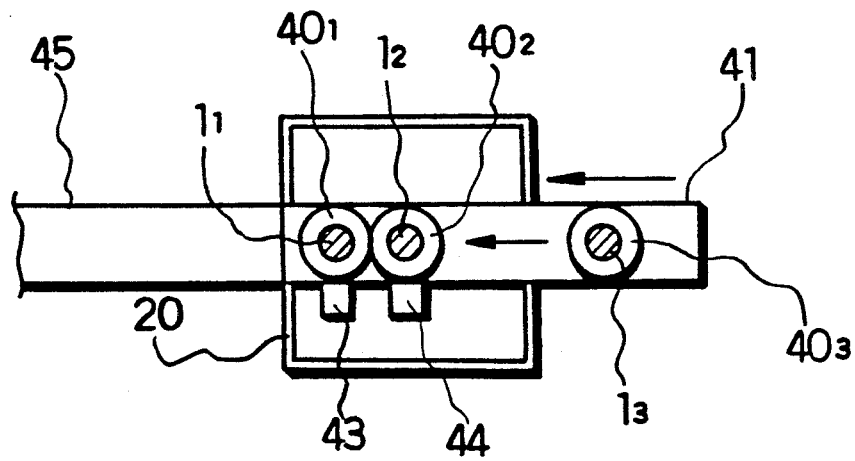
FIG. 13 (1) is a plan view showing the sixth process.
Figure 13:
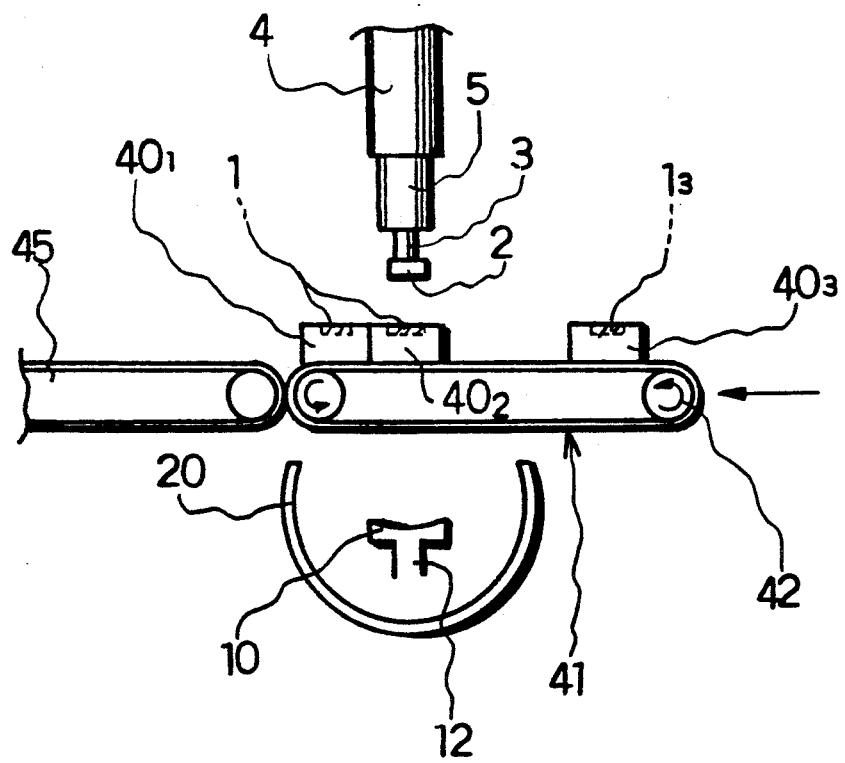

FIG. 13 shows the sixth process. The supply belt conveyer 41 is moved in the lefthand direction of the drawing to a second position. This second position is a position where the axis of the chuck 2 passes the axial center of the lens material $1_1$ accommodated in the container $40_1$. Then, the container $40_1$ is released from its fixed condition, followed by carrying the container $40_3$ which contains a lens material $1_3$ to be ground on the supply belt conveyer 41.

Figure 14:
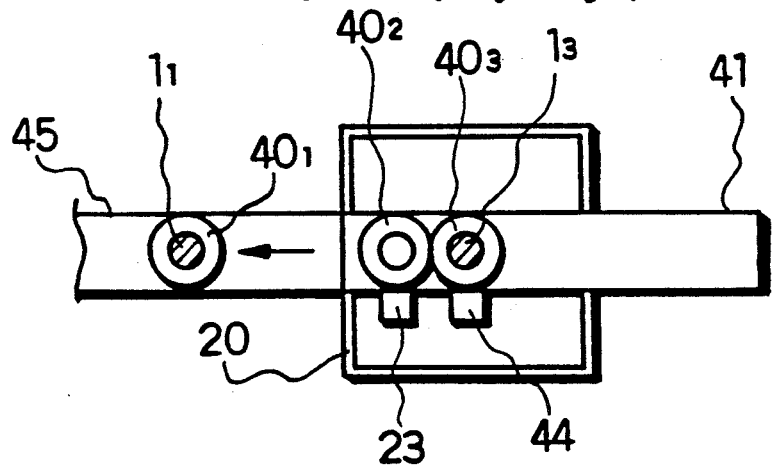
FIG. 14 (1) is a plan view showing the seventh process.
Figure 14:
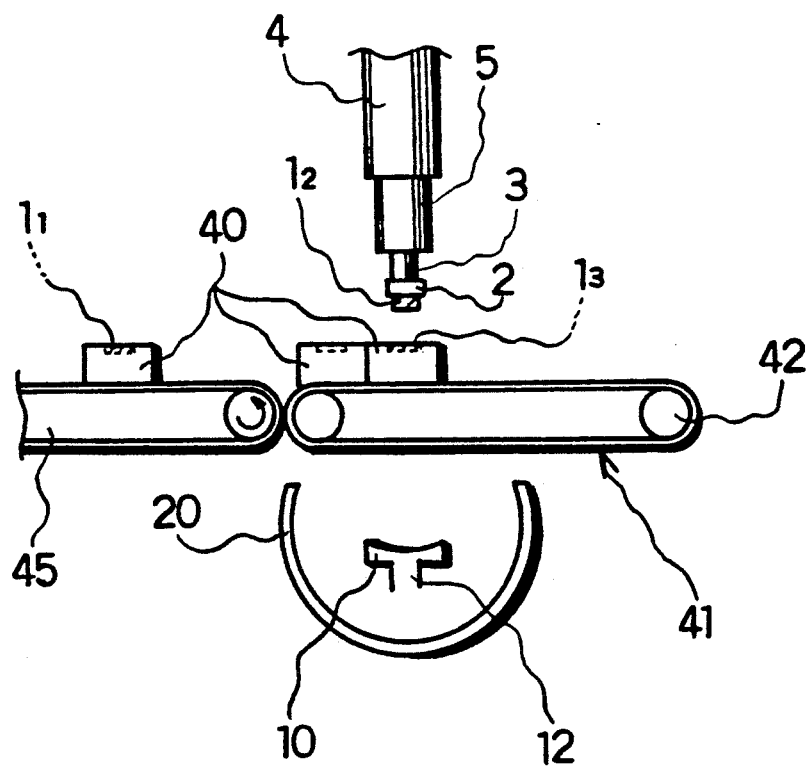

FIG. 14 shows the seventh process, where the supply belt conveyer 41 and the transporting belt conveyer 45 are run. The container $40_1$ is transferred onto the transporting belt conveyer 45 to be carried to a predetermined place. At the same time, the lens material $1_2$ in the container $40_2$ fixed by the fixture 44 is firmly absorbed on the chuck 2 which is then elevated with the lens material $1_2$. Thereafter, when the container $40_2$ is released from the fixed condition, since the supply belt conveyer 41 is running, the containers $40_2$, $40_3$ are transported to certain positions of the fixtures 43, 44, where the containers $40_2$, $40_3$ are fixed. The belt conveyer 41 is next moved in the righthand direction of FIG. 14, and the arm base 4 is lowered to return to the fourth process, where the grinding of the lens material $1_2$ is started (see FIG. 11). The above processes are repeated to repetitively supply, grind and transport the lens material 1 to manufacture finished lenses.

According to the transporting apparatus for optical lenses, mirrors and so on of the present invention, a lens to be ground accommodated in a container is transported by a supply means to the position of the axis of a grinding holder, received by the grinding holder, and a vacant container is transported to the position of the axis of the grinding holder by the supply means to receive the ground lens. The container with the ground lens is transferred from the supply means to a transport means which transports the container to a predetermined place.

Thus, since the present invention includes a reduced number of transfer processes of the container or the lens to be ground, it is possible to correspondingly reduce accidents of falling lenses. It is also possible to make the apparatus simpler and smaller with respect to mechanical as well as software viewpoints. Also, lenses to be ground can be directly transported to the grinding holder by the supply means and transport ground lenses directly to the outside by the transport means, thereby rendering it possible to reduce the loading time.

I claim:

1. A spherical surface machining apparatus for machining materials to be machined such as optical lenses and mirrors by rotating and swinging a lower shaft of a grinding plate and pressing the material to be machined on the spherical axis with respect to the grinding plate, said machining apparatus comprising:

an exchangeable reference cam, mounted on one side of said grinding plate, having a curved or plane cam profile and a portion of a cam surface formed with a rack; and a swing body movably mounted on said cam surface of said reference cam through a driving cam follower meshing with said rack for axially movably supporting the lower shaft of said grinding plate, wherein the lower shaft of said grinding plate is axially moved and said driving cam follower is driven to thereby make free the spherical center swinging trajectory of the lower shaft of the grinding plate.

2. A spherical surface machining apparatus according to claim 1, wherein said swing body is supported by the driving cam follower meshing with the rack, a swinging cam follower moving on a non-racked surface of the cam surface and a swing stop cam follower moving on a plane perpendicular to the cam surface of said reference cam so as not to break away from said reference cam.

3. A spherical surface machining apparatus according to claim 1, wherein said swing body is provided with a driving means for driving said cam follower.

* * * * *